T. E. MURRAY.
WELDING ELECTRODE.
APPLICATION FILED DEC. 4, 1918.
1,295,570.
Patented Feb. 25, 1919.
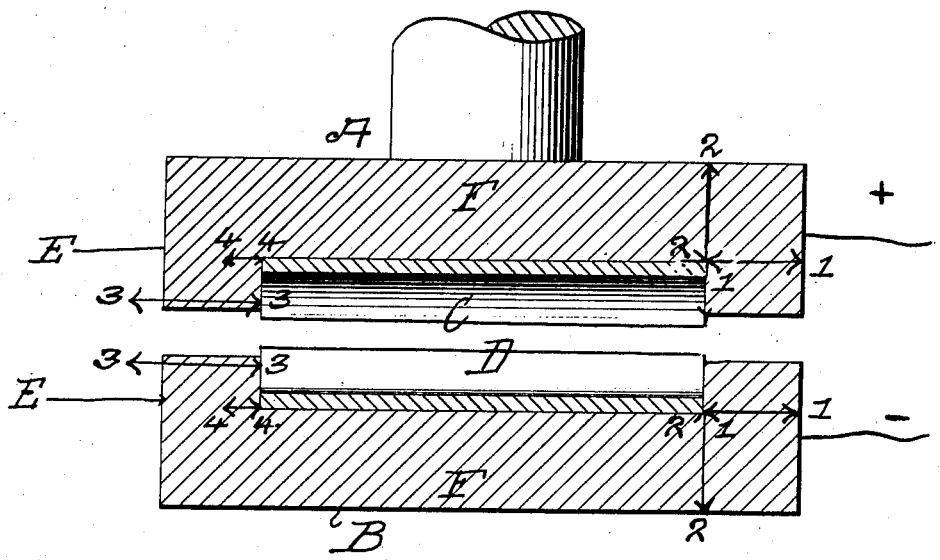

UNITED STATES PATENT OFFICE.

THOMAS E. MURRAY, OF NEW YORK, N. Y.

WELDING-ELECTRODE.

1,295,570.  Specification of Letters Patent.  Patented Feb. 25, 1919.

Application filed December 4, 1918. Serial No. 265,203.

*To all whom it may concern:*

Be it known that I, THOMAS E. MURRAY, a citizen of the United States, residing at New York, in the county of New York and State of New York, have invented a certain new and useful Improvement in Welding-Electrodes, of which the following is a specification.

Where two elongated bodies such as the longitudinal half sections of a tubular object of sheet metal are placed with their edges in contact registry and electrically welded together, imperfect union may occur at the ends of the joints and for some distance inwardly from said ends. My present invention obviates this difficulty, and consists in the construction of the electrodes wherein said half sections are seated.

The accompanying drawing is a longitudinal section of the welding electrodes and the half sections aforesaid seated therein.

A and B are the electrodes, each having a cavity shaped to receive the half sections C, D which are to be welded at their longitudinal edges. Each electrode is to be constructed with end walls E of a thickness not less than the minimum thickness of any other wall of said electrode. Thus, to illustrate, the thickness of the vertical end walls E, represented by arrows 1, 1, is here shown equal to the minimum thickness of the horizontal walls F, represented by arrows 2, 2. The thickness of said end walls E instead of being equal to that of the horizontal wall F, as here shown, may be greater, and as represented, for example, by the arrows 3, 3, but it should not be less, or as represented, for example, by the arrows 4, 4.

With the electrodes thus constructed, imperfect union of metal at and near the joints will be obviated.

I claim:

A welding electrode having a cavity for receiving an elongated object to be welded, each end wall of said electrode being of a thickness not less than the minimum thickness of any other wall of said electrode.

In testimony whereof I have affixed my signature in presence of two witnesses.

THOMAS E. MURRAY.

Witnesses:
 GERTRUDE T. PORTER,
 MAY T. MCGARRY.